(12) United States Patent
Tsubokawa

(10) Patent No.: US 9,326,246 B2
(45) Date of Patent: Apr. 26, 2016

(54) MOBILE TERMINAL AND CONTROL METHOD THEREOF

(75) Inventor: Yasuhisa Tsubokawa, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/369,557

(22) Filed: Feb. 9, 2012

(65) Prior Publication Data

US 2012/0208602 A1 Aug. 16, 2012

(30) Foreign Application Priority Data

Feb. 10, 2011 (JP) ................................. 2011-027225

(51) Int. Cl.
*H04W 52/02* (2009.01)

(52) U.S. Cl.
CPC ................................. *H04W 52/0254* (2013.01)

(58) Field of Classification Search
CPC ............ H04M 1/0231; H04M 1/0235; H04M 1/0245; H04M 1/22; H04M 1/23; H04M 1/7258; H01H 13/023; H01H 13/83; G09G 3/3406; H04W 52/0254; H04W 52/027
USPC ............. 455/566, 575.1, 575.4; 345/169, 170
See application file for complete search history.

(56) References Cited

U.S. PATENT DOCUMENTS

| | | | |
|---|---|---|---|
| 6,725,064 B1* | 4/2004 | Wakamatsu | H04M 1/22 345/102 |
| 7,779,370 B2* | 8/2010 | Mavinkurve et al. | 715/864 |
| 8,155,692 B1* | 4/2012 | Roka | 455/550.1 |
| 2005/0073446 A1* | 4/2005 | Lazaridis et al. | 341/22 |
| 2009/0284481 A1* | 11/2009 | Zhuang et al. | 345/173 |
| 2009/0303187 A1* | 12/2009 | Pallakoff | 345/169 |
| 2010/0081476 A1* | 4/2010 | Markiewicz et al. | 455/566 |
| 2010/0090959 A1* | 4/2010 | Zaremba | 345/169 |
| 2011/0122069 A1* | 5/2011 | Asakura et al. | 345/169 |
| 2011/0148308 A1* | 6/2011 | Yu et al. | 315/149 |
| 2012/0165072 A1* | 6/2012 | Griffin | 455/566 |

FOREIGN PATENT DOCUMENTS

| | | |
|---|---|---|
| JP | 2006-262533 A | 9/2006 |
| JP | 2009-188619 A | 8/2009 |
| JP | 2010-273163 A | 12/2010 |
| WO | 2008/038381 A1 | 4/2008 |

OTHER PUBLICATIONS

Office action dated Jul. 16, 2014 issued for counterpart Japanese application No. 2011-027225.

* cited by examiner

*Primary Examiner* — George Eng
*Assistant Examiner* — Hung Du
(74) *Attorney, Agent, or Firm* — Procopio, Cory, Hargreaves & Savitch LLP

(57) ABSTRACT

A mobile phone apparatus as one example of mobile terminals includes a processor, and the processor detects whether or not the mobile phone apparatus is in an open position in response to magnetism data from a magnetic sensor. The processor makes a backlight light up to illuminate a hardware key in a case that it is in the open position and a character input to a predetermined input region is instructed. The backlight shuts off when the character input is ended, or when the mobile phone apparatus is released from the open position during the character input.

8 Claims, 10 Drawing Sheets

FIG. 2
(A) CLOSED POSITION
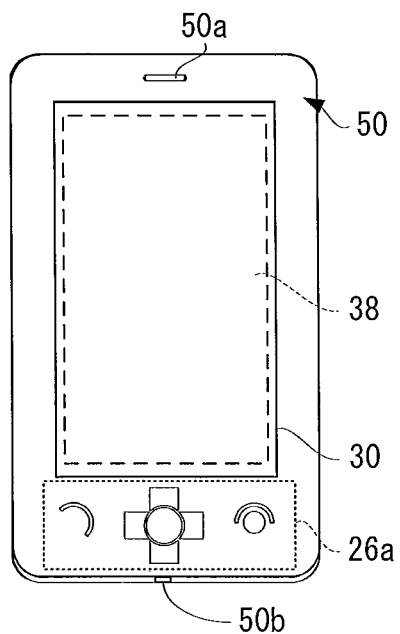
(B) OPEN POSITION
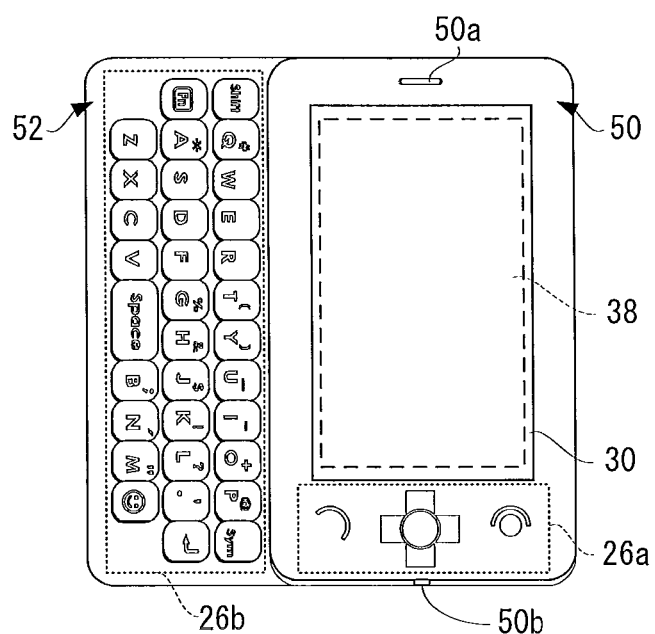

FIG. 4
(A) MAIN MENU SCREEN  100
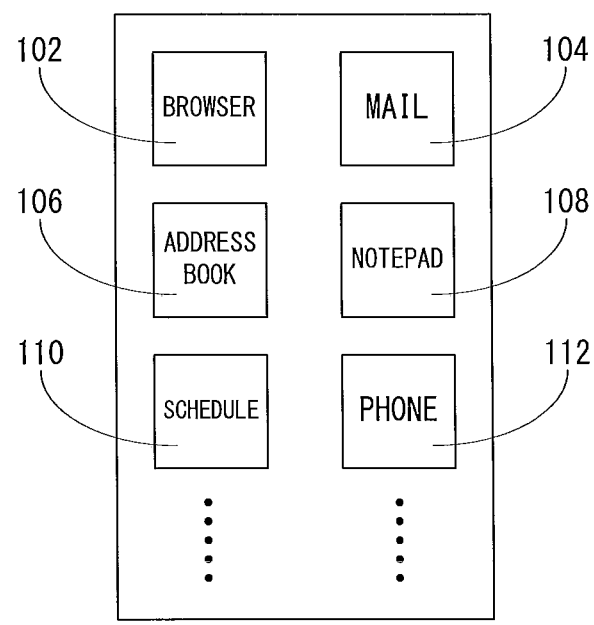
(B) WEB SCREEN  200
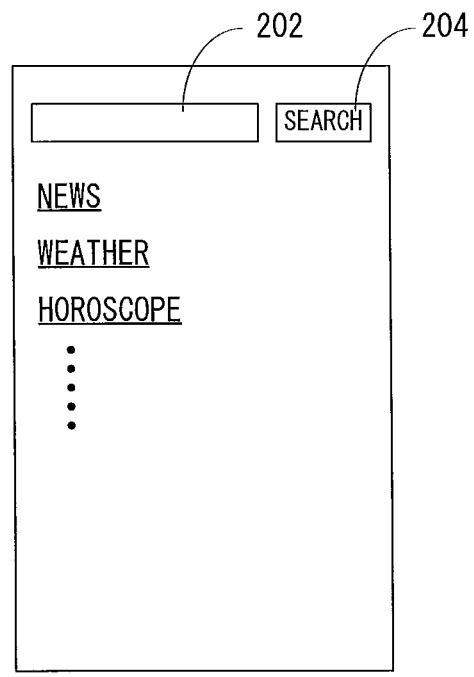

FIG. 5
(A) WEB SCREEN 200
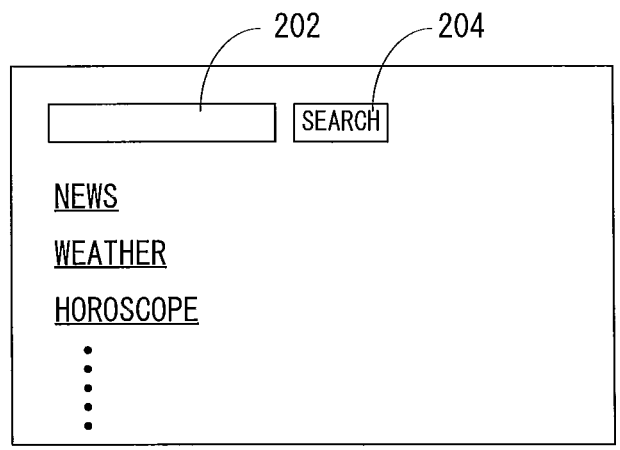
(B) SEARCH WORD INPUT SCREEN 250
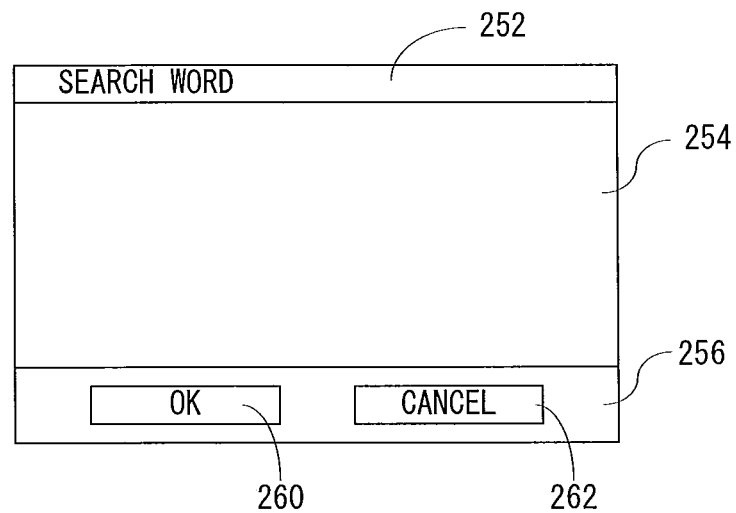

FIG. 6
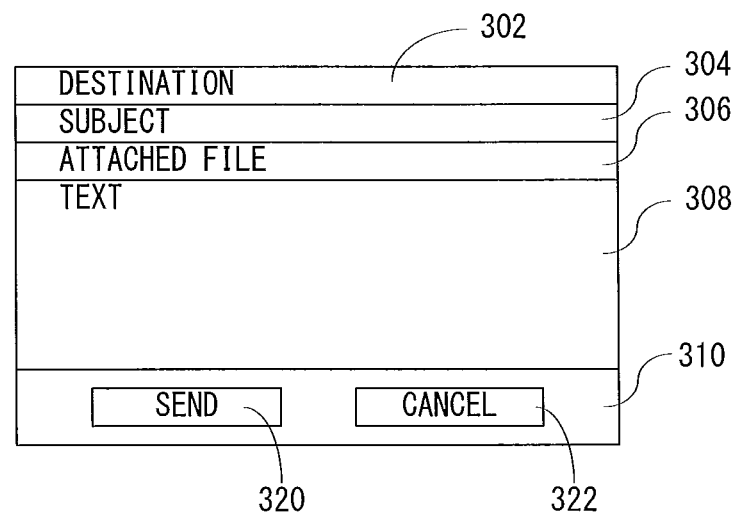
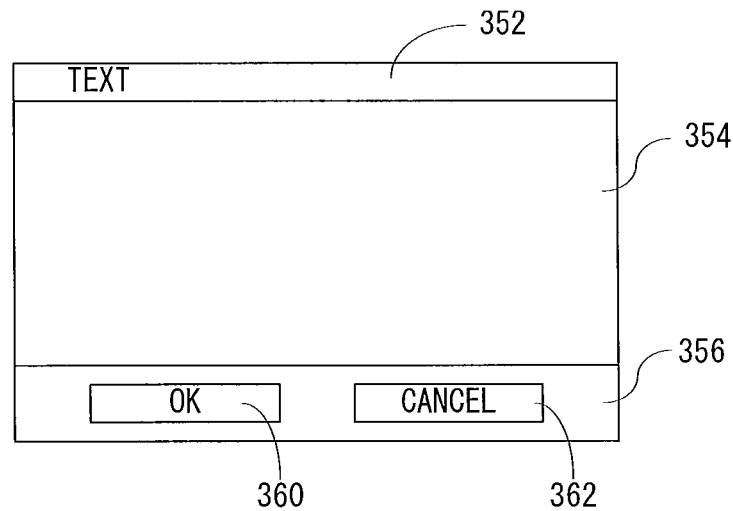

FIG. 7
(A) ADDRESS BOOK NEW REGISTRATION SCREEN 400
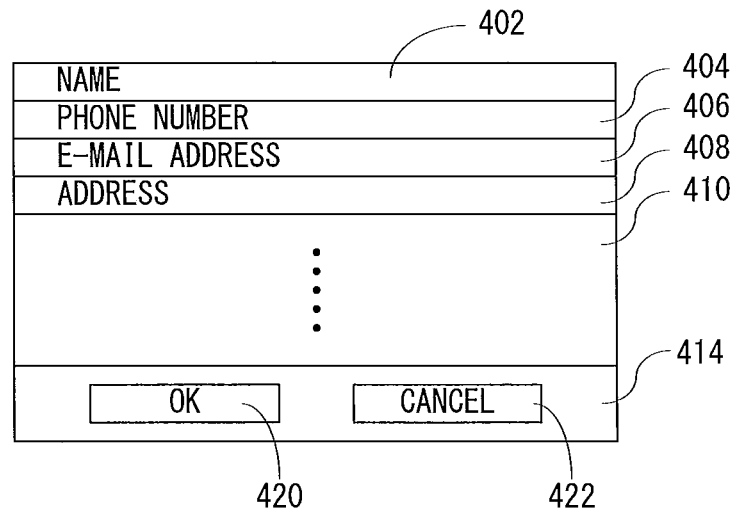
(B) NAME INPUT SCREEN 450
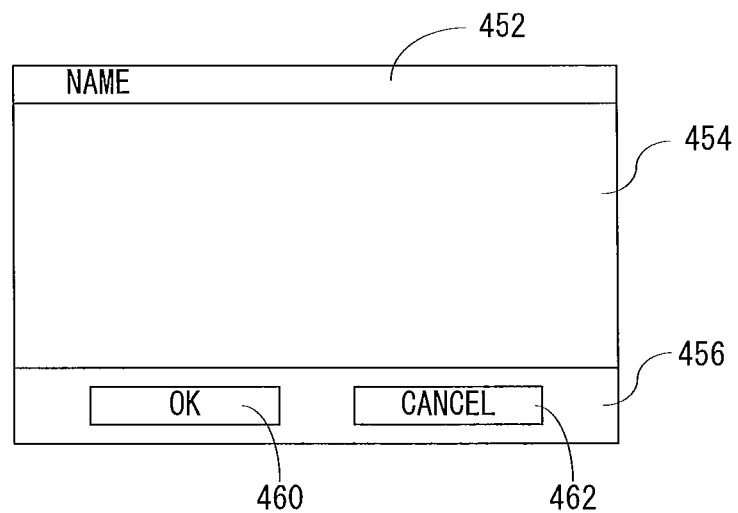

MOBILE TERMINAL AND CONTROL METHOD THEREOF

RELATED APPLICATION

The present application claims priority to Japanese Patent Application No. 2011-27225 filed Feb. 10, 2011, which is incorporated herein by reference in its entirety.

BACKGROUND OF THE INVENTION

1. Field of the Invention

The present invention relates to a mobile terminal and a control method thereof. More specifically, the present invention relates to a mobile terminal having hardware keys and a control method thereof.

2. Description of the Related Art

One example of a related art of a mobile terminal of such a kind is disclosed in a Japanese Patent Application Laying-Open No. 2006-262533 [H04M 1/73, H04M 1/00] (document 1) laid-open on Sep. 28, 2006. In the mobile phone of this document 1, a key operating portion need not be operated during reception of information and execution of a karaoke function, and therefore, although a liquid crystal panel and a key operating portion are illuminated for a predetermined period from the start of the information reception and the karaoke function, but after a lapse of the predetermined period, lighting of the key operating portion is suspended while lighting of the liquid crystal panel is maintained. Furthermore, in the mobile phone of the document 1, in a sending operation of electronic mail, when a "character/numeric input mode" is not executed, lighting of a numeric keypad (character/numeric input key) is suspended. Thus, in the mobile phone of the document 1, electric power consumption by the lighting is reduced.

Furthermore, another example of the related art of the mobile terminal of such the kind is disclosed in a Japanese Patent Application Laying-Open No. 2009-188619 [H04M 1/00, H04M 1/725, G06F 3/02] (document 2) laid-open on Aug. 20, 2009. The mobile terminal apparatus of the document 2 make a liquid crystal and a key backlight light up when detecting the start of opening a sliding portion of cases, and displays a standby screen on a displayer when detecting the open position of the sliding portion at the latest. Thus, a waiting time from when the user opens the sliding portion to when he or she operates the mobile terminal apparatus is shortened.

Additionally, a still another example of the related art of performing a key backlight control of turning off the backlight for a fixed period of time measured by the time counter in response to detection of depression of a key, and reducing a consumption current during a key operation is disclosed in a WO 2008/038381 [G06F 3/02, G06F 1/28, H04M 1/73, H04M 1/02, H04M 1/22] (document 3) laid-open on Apr. 3, 2008.

However, in the document 1, after lighting of the liquid crystal panel and the key operating portion is suspended, if a touch operation to a touch sensor or a key operation to a key operating portion is performed, lighting both of the key operating portion and the liquid crystal panel is started. Thus, when lighting the key operating portion is started in response to a touch operation, if no operation is performed on the key operating portion thereafter, waste of electric power consumption due to lighting of the key operating portion occurs.

Also, in the document 2, when the sliding portion of the mobile terminal apparatus starts to be opened, the key backlight is lit up, and therefore, a waste of electric power consumption from the start of the light-up to the key operation occurs. Furthermore, after the sliding portion of the case of the mobile terminal apparatus is opened, if no operation is performed as well, a waste of electric power consumption due to lighting the key backlight similarly occurs.

In addition, in the document 3, a consumption current during the key operation can be reduced, but even if the technique of the document 3 is adopted, it is impossible to solve the problem of the document 1 and the document 2.

SUMMARY OF THE INVENTION

Therefore, it is a primary object of the present invention to provide a novel mobile terminal and control method thereof.

Furthermore, another object of the present invention is to provide a mobile terminal and a control method thereof capable of making the last of a battery as long as possible.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first aspect of the present invention is a mobile terminal comprising: a displayer; a hardware key; and an illuminator which illuminates the hardware key, wherein the illuminator starts to illuminate when a character input to a predetermined character input region displayed on the displayer is instructed.

In the first aspect of the present invention, a mobile terminal (10) comprises a displayer (30), a hardware key (26b), and an illuminator (44). The illuminator illuminates the hardware key. Here, the mobile terminal makes the illuminator start to illuminate when a character input in the predetermined character input region displayed on the displayer is instructed ("YES" in S3).

According to the first aspect of the present invention, when there is an instruction of a character input, the illuminator starts to illuminate, and thus, in a case that no input is made, the illuminator never lights up, and therefore, it is possible to reduce a waste of electric power consumption. Accordingly, it is possible to make the last of the battery as long as possible.

A second aspect of the present invention is a mobile terminal comprising: a displayer; a touch panel provided on the displayer; a hardware key; and an illuminator which illuminates the hardware key; wherein the illuminator starts to illuminate when a predetermined character input region displayed on the displayer is touched by an input to the touch panel.

A third aspect of the present invention is a control method of a mobile terminal comprising: a displayer; a hardware key; and an illuminator which illuminates the hardware key, wherein the illuminator starts to illuminate when a character input to a predetermined character input region displayed on the displayer is instructed.

A fourth aspect of the present invention is a controlling method of a mobile terminal comprising a displayer; a touch panel provided on the displayer; a hardware key; and an illuminator which illuminates the hardware key, wherein the illuminator starts to illuminate when a predetermined character input region displayed on the displayer is touched by an input in the touch panel.

In the second to fourth aspects as well, similar to the first aspect, it is possible to make the last of a battery as long as possible.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing an appearance of the mobile phone apparatus shown in FIG. 1;

FIG. 4 is an illustrative view showing examples of a main menu screen and a web screen that are to be displayed on a display shown in FIG. 1;

FIG. 5 is an illustrative view showing examples of the web screen and a search word input screen that are to be displayed on the display shown in FIG. 1 display;

FIG. 6 is an illustrative view showing examples of a new mail creation screen and a mail text creation screen that are to be displayed on the display shown in FIG. 1;

FIG. 7 is an illustrative view showing examples of an address book new registration screen and a name input screen that are to be displayed on the display shown in FIG. 1;

DETAILED DESCRIPTION OF THE PREFERRED EMBODIMENTS

Figure 1:
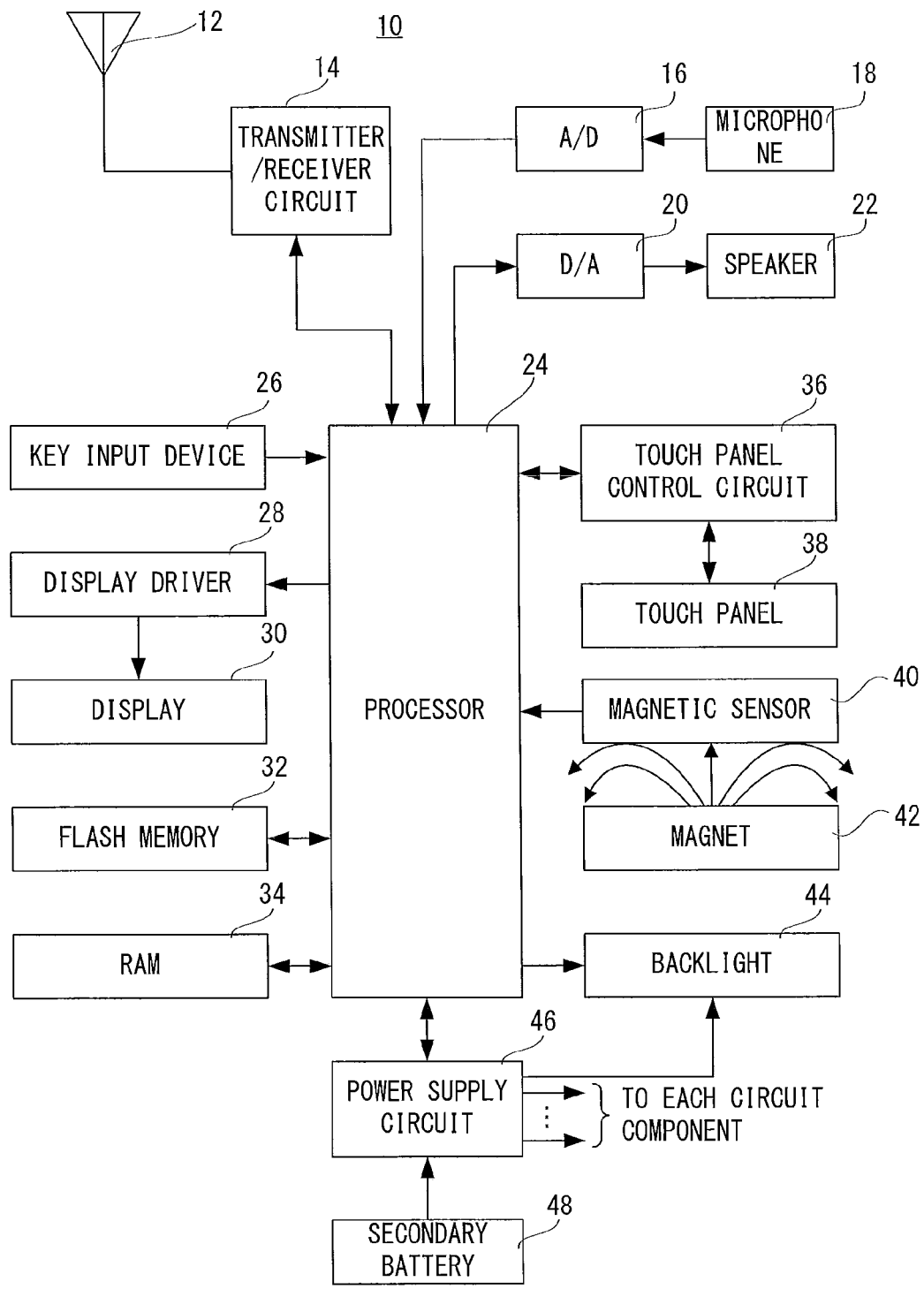
FIG. 1 is a block diagram showing an electric configuration of a mobile phone apparatus of one embodiment of the present invention.

Referring to FIG. 1, a mobile phone apparatus 10 of the present embodiment is one kind of mobile terminals, and includes a processor 24 which is called a "CPU" or a "computer". The processor 24 is connected with a transmitter/receiver circuit 14, an A/D converter 16, a D/A converter 20, a key input device 26, a display driver 28, a flash memory 32, an RAM 34, a touch panel control circuit 36, a magnetic sensor 40, a backlight 44 and a power supply circuit 46. Also, the transmitter/receiver circuit 14 is connected with an antenna 12, the A/D converter 16 is connected with a microphone 18, and the D/A converter 20 is connected with a speaker 22 via an amplifier (not illustrated). The display driver 28 is connected with a display 30. The touch panel control circuit 36 is connected with a touch panel 38. The power supply circuit 46 is connected with a secondary battery 48.

The processor 24 entirely controls the mobile phone apparatus 10. The RAM 34 is utilized as a work area (including a depiction area) or a buffer area of the processor 24. In the flash memory 32, content data of characters, images, voices, sounds, and video images of the mobile phone apparatus 10 are recorded.

The A/D converter 16 converts an analog voice signal relative to a voice or a sound that is input through the microphone 18 connected to the A/D converter 16 into a digital voice signal. The D/A converter 20 converts (decodes) a digital voice signal into an analog voice signal, and applies the converted signal to the speaker 22 via an amplifier. Accordingly, a voice or a sound corresponding to the analog voice signal is output from the speaker 22.

The key input device 26 is provided with a plurality of hardware keys, and specifically includes an off-hook key, and an on-hook key, an alphabetical character key, a space key, an enter key, etc. Then, information (key data) of a key operated by the user is input to the processor 24.

Here, when each key included in the key input device 26 is operated, feedback processing is executed to thereby output a feedback sound from another speaker (not shown) different from the speaker 22a. Thus, the user can achieve an operational feeling against the key input operation by hearing the feedback sound. Also, in a case that each key included in the key input device 26 is operated, a vibrator may be vibrated in place of the feedback sound, or the vibrator may be vibrated together with the feedback sound. In this case, the user can achieve an operational feeling against the key input operation by vibration of the vibrator.

The display driver 28 controls a display of the display 30 connected to the display driver 28 under an instruction of the processor 24. Here, the display driver 28 includes a video memory (not illustrated) for temporarily storing image data to be displayed.

The touch panel 38 is a pointing device for pointing an arbitrary position on the screen of the display 30. The touch panel 38 of this embodiment is an electrical capacitive type in which changes in capacitances between electrodes occurring by an approach of an object such as a finger to its surface thereof, and can detect a touch of one or a plurality of fingers on the touch panel 38, for example. When the touch panel 38 is operated by being pushed, stroked, or touched on its surface (the top surface) with the finger, it detects the operation. More specifically, when the finger touches the touch panel 38, the touch panel control circuit 36 functioning as a touch detector specifies the operated position, and outputs data of coordinates (coordinate data) indicative of the operated position to the processor 24. That is, the user can input to the mobile terminal 10 a position and a direction of an operation and a design by pressing, stroking, touching, or the like the top surface of the touch panel 38 with the finger. It should be noted that an operation of touching the top surface of the touch panel 38 with the finger by the user may be referred to as a "touch" in this embodiment. Also, an operation performed on the touch panel 38 may be called a "touch operation".

It should be noted that a touch operation may be performed by other objects such as a touch pen to which an electric conductor is attached at the tip thereof, without being restricted to fingers. Furthermore, as a detection system of the touch panel 38, a surface capacitive type may be adopted, and a resistance film type, a ultrasonic type, an infrared ray type, an electromagnetic induction type, etc. may be adopted.

The magnetic sensor 40 detects magnetism that is emitted by the magnet 42, and outputs data (magnetism data) relating to a value of the magnetism to the processor 24. Then, the processor 24 detects whether or not the mobile phone apparatus 10 is in the open position (see FIG. 2) based on the value of the magnetism corresponding to the magnetism data from the magnetic sensor 40. The power supply circuit 46 controls supply and stop of electric power from the secondary battery 48 to each of the circuit components under the instruction of the processor 24.

The transmitter/receiver circuit 14 is a circuit for performing a wireless communication in a CDMA system. For example, when the user instructs the mobile phone apparatus 10 to transmit a voice transmission by utilizing the key input device 26, the transmitter/receiver circuit 14 executes voice transmitting processing under the instruction of the processor 24 and outputs a voice transmitting signal via the antenna 12. The voice transmitting signal is transmitted to a telephone apparatus of a communication partner through base stations and communication networks (not illustrated). Then, when incoming call processing is performed in the telephone apparatus of the communication partner, a connection state (communication possible state) is established, and the processor 24 executes speech communication processing.

Describing normal speech communication processing in detail, a modulated voice signal (high frequency signal) transmitted from the telephone apparatus of the communication partner is received by the antenna 12. The received modulated voice signal undergoes demodulation processing and decoding processing by the transmitter/receiver circuit 14. The received voice signal acquired by such the processing is converted in to an analog voice signal by the D/A 20, and then, the converted analog signal is output from the speaker 22. On the other hand, a voice signal to be transmitted captured through the microphone 18 is converted into a digital voice signal by the A/D converter 16, and then, the converted digital voice signal is applied to the processor 24. The signal to be transmitted which is converted into the digital voice signal undergoes coding processing and modulation processing by the transmitter/receiver circuit 14 under the control of the processor 24, and the resultant signal is output via the antenna 12. Accordingly, the modulated voice signal is transmitted to the telephone apparatus of the communication partner via the base stations and the communication networks.

Furthermore, when a transmitting signal from the telephone apparatus of the communication partner is received by the antenna 12, the transmitter/receiver circuit 14 notifies the processor 24 of an incoming call (also referred to as "call in"). In response thereto, the processor 24 controls the display driver 28 to display calling source information (phone number) described in the incoming call notification on the display 30. At approximately the same time, the processor 24 outputs an incoming call tone (may be called an incoming call melody, an incoming call sound) from the other speaker described above. Furthermore, the processor 24 may vibrate the mobile phone apparatus 10 by driving (rotating) a motor not shown. Here, in place of an output of the incoming call tone, the mobile phone apparatus 10 may be vibrated.

When the user performs an answer operation by utilizing the off-hook key in response to the incoming call, the transmitter/receiver circuit 14 executes call-in processing to establish a connected state (communication possible state) under the control of the processor 24, and then, the processor 24 executes the above-described normal speech communication processing.

When a speech communication end operation is performed by the on-hook key after the transition to the communication possible state, the processor 24 controls the transmitter/receiver circuit 14 to transmit a speech communication end signal to the communication partner. After transmission of the speech communication end signal, the processor 24 ends the speech communication processing. In a case that a speech communication end signal is first received from the communication partner as well, the processor 24 ends the speech communication processing. In addition, in a case that a speech communication end signal is received not from the communication partner but from the mobile communication network as well, the processor 24 ends the speech communication processing.

Although illustration is omitted, by establishing data communications with a server connected to the networks, the mobile phone apparatus 10 can execute a mail function and a browser function. In addition, an address book function for managing address book data stored in the flash memory 32 can also be executed.

FIG. 2 (A) is an external view showing the slidable mobile phone apparatus 10 in a closed position, and FIG. 2 (B) is an external view showing the slidable mobile phone apparatus 10 in the open position. As understood from FIG. 2 (B), the mobile phone apparatus 10 has a first case 50 and a second case 52 each being a planar rectangle. Furthermore, the first case 50 and the second case 52 are approximately the same in thickness (see FIG. 3(B)).

The first case 50 is coupled to the second case 52 by means of a sliding mechanism not shown so as to be stacked (piled) on the second case. In this embodiment, as shown in FIG. 2 (B), the first case 50 is slidable in the direction of the width of the second case 52. Here, respective substrates contained in the first case 50 and the second case 52 are electrically connected by a flexible printed wiring substrate.

As understood from FIG. 2 (A) and FIG. 2 (B), the display 30 is provided such that the monitor screen is exposed from the top surface of the first case 50. Furthermore, on the top surface of the display 30, the touch panel 38 is provided. In FIG. 2 (A) and FIG. 2 (B), the touch panel 38 is represented so as to be smaller than the display 30 by a frame of a dotted line, but a display region of the display 30 and a detection area of the touch panel 38 actually have the same or approximately the same size.

Furthermore, the above-described speaker 22 is contained in the first case 50, and an opening 50a communicating with the contained speaker 22 is provided at one end of the direction of the length of the first case 50 and on the top surface thereof. In examples shown in FIG. 2 (A) and FIG. 2 (B), the opening 50a is provided on the upper side of the display 30. Also, the above-described microphone 18 is contained in the first case 50, and an opening 50b communicating with the contained microphone 18 is provided at the other end of the direction of the length of the first case 50, and on an inclined surface (taper surface) between the top surface and a side surface (top end surface).

Also, as shown in FIGS. 2 (A) and (B), the key input device 26 includes a first keypad 26a and a second keypad 26b each being made up of a plurality of hardware keys. The first keypad 26a is made up of a direction key, an off-hook key, an on-hook key, a menu key and a decision key, and is provided on the top surface of the first case 50 at the end opposite to the opening 50a, sandwiching the display 30 with the opening 50a. Furthermore, the second keypad 26b is made up of alphabetical character keys, a space key, an enter key, etc. according to the QWERTY layout, and provided on the top surface of the second case 52. In addition, as shown in FIG. 2 (B), in a case that the mobile phone apparatus 10 is held laterally for the convenience of the keyboard layout, that is, in a case that it is turned to the left (counterclockwise) 90 degrees, the second keypad 26b is provided such that respective keys are arranged in a suitable direction for the user.

Although not understood from the drawing, a backlight 44 for illuminating each key is provide on a bottom surface of the second keypad 26b inside the second case 52. Although illustration is omitted, the backlight 44 is made up of a plurality of LEDs that are provided to be brought into correspondence with the respective keys on the bottom surface of the second keypad 26b.

It should be noted that the keyboard layout is not restricted to the QWERTY layout, and other layouts may be adopted.

For example, although illustration is omitted, the user enters a phone number by operating a dial key (software keys) including "0" to "9" keys, "*" key and "#" key that are displayed on the display 30, performs a incoming call operation by the off-hook key, and makes a speech communication end operation by the on-hook key. Furthermore, the user can display a main menu screen by operating the menu key, and select and decide an arbitrary menu by a touch operation. Here, in a case that the main menu screen is displayed, an arbitrary menu can be selected by operating the direction key, and can also decide the selected menu by further operating the decision key. The user switches the power of the mobile phone apparatus 10 between ON and OFF by holding the on-hook key on.

Figure 3:
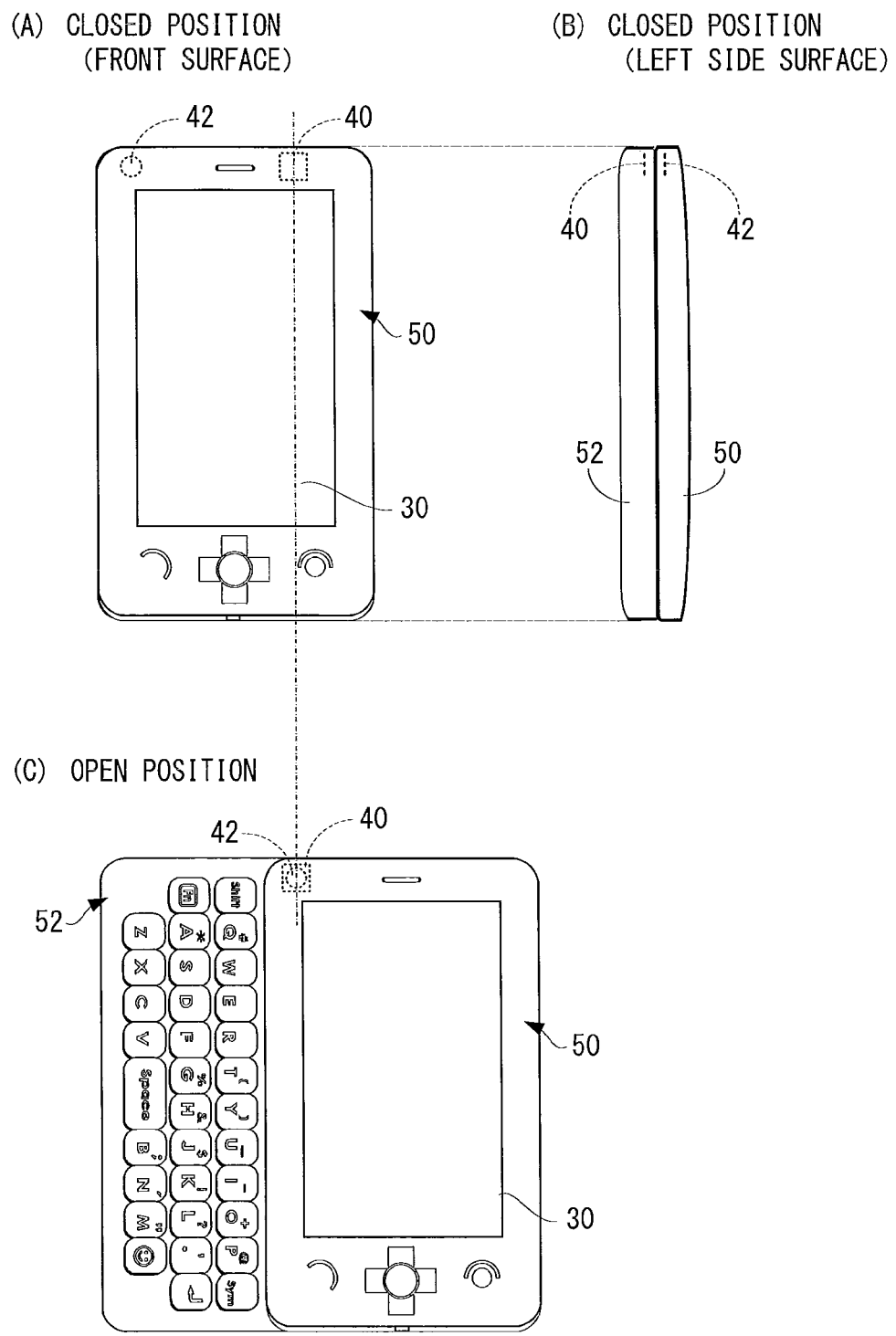
FIG. 3 is an illustrative view showing a positional relationship between a magnetic sensor and a magnet in a case that a first case shown in FIG. 1 is slid in a direction of the width of the second case.

The magnetic sensor 40 detects magnetism emitted from the magnet 42, and outputs data indicative of the numerical value to the processor 24. On the basis thereof, the processor 24 determines whether or not the mobile phone apparatus 10 is in at least the open position as shown in FIG. 2 (B). As shown in FIG. 3(A) to FIG. 3(C), the magnetic sensor 40 is provided inside the second case 52 at the upper left thereof. Also, the magnet 42 is provided inside the first case 50 toward the right from the upper center. It should be noted that FIG. 3(B) is an illustrative view when the mobile phone apparatus 10 shown in FIG. 3(A) is viewed from the left.

As shown in FIG. 3(A), in a case that the mobile phone apparatus 10 is in the closed position, the magnetic sensor 40 and the magnet 42 are furthest from each other, and the numerical value data corresponding to the magnetism output from the magnetic sensor 40 to the processor 24 indicates a minimum value. On the other hand, as shown in FIG. 3(C), in a case that the mobile phone apparatus 10 is in the open position, the magnetic sensor 40 and the magnet 42 are placed in the stacked position and closest to each other. At this time, the numerical value data corresponding to the magnetism output to the processor 24 from the magnetic sensor 40 indicates a maximum value.

In this embodiment, in order that only when the mobile phone apparatus 10 is in the open position, the backlight 44 illuminates, the numerical value data (maximum value data) relating to the maximum value of the magnetism of the magnet 42 to be detected by the magnetic sensor 40 is stored in advance, and when the maximum value data is detected, the processor 24 determines that the mobile phone apparatus 10 is in the open position. This is because of eliminating a case that a state between the open position and the closed position of the mobile phone apparatus 10, that is, a sliding state of the first case 50 is determined as an open position. This is to shorten the time of the illumination of the backlight 44 as much as possible to thereby lower the power consumption.

Here, the numerical value data (minimum value data) relating to the minimum value of the magnetism of the magnet 42 to be detected by the magnetic sensor 40 is also stored in advance, and when the minimum value data is detected, the processor 24 determines that the mobile phone apparatus 10 is in the closed position.

Furthermore, the antenna 12, the transmitter/receiver circuit 14, the processor 24, the display driver 28, the flash memory 32, the RAM 34, the touch panel control circuit 36, the power supply circuit 46 and the secondary battery 48 that are shown in FIG. 1 are contained in the first case 50 or the second case 52, and are omitted in FIG. 2 (A), FIG. 2 (B), and FIG. 3(A) to FIG. 3(C).

With respect to such the mobile phone apparatus 10, when the main power supply is turned on, or it is activated (returned) from the sleep (standby) state, for example, a main menu screen 100 as shown in FIG. 4(A) is displayed on the display 30. Here, in a case that the main menu screen 100 shown in FIG. 4(A) (this holds true for FIG. 4(B)) is displayed, the mobile phone apparatus 10 is in the closed position.

It should be noted that when the mobile phone apparatus 10 is in the closed position, the display 30 is used longitudinally, and when the mobile phone apparatus 10 shifts to the open position, the display 30 is changed to be used laterally. This holds true hereunder.

As shown in FIG. 4(A), on the main menu screen 100, a plurality of icons 102, 104, 106, 108, 110, 112, . . . are displayed. Each of the icons 102-112 is assigned a predetermined function. In the example shown in FIG. 4(A), the icon 102 is assigned a browser function, and the icon 104 is assigned a mail function. Also, the icon 106 is assigned an address book function, and the icon 108 is assigned a notepad function. In addition, the icon 110 is assigned a schedule function, and the icon 112 is assigned a phone function.

Although illustration is omitted, icons to which other functions, such as a calculator function, an option functions, etc., for example, are assigned are also displayed so that selection is possible.

For example, when the icon 102 is touched to execute the browser function, a web screen 200 as shown in FIG. 4(B) may be displayed on the display 30. On the web screen 200 shown in FIG. 4(B), a display region 202 for selecting an input of a search word and displaying the input search word, and a button image 204 for executing the search are displayed (provided). Furthermore, below the display region 202, character strings to which hyperlinks for transferring to other web pages, such as "news", "weather", "horoscope", etc. are set are displayed.

Here, an operation effective region (range of coordinates) of the touch panel 38 corresponding to each display region of each of the icons 102-112 is decided in advance, and the processor 24 can specify any one of the touched icons 102-112 in correspondence with the coordinate data input from the touch panel control circuit 36. This holds true for a case that display regions, input regions, and button images are touched in this embodiment.

In the mobile phone apparatus 10 of the present embodiment, in a case that a search word is to be input, the user touches the display region 202 to make a switch to a mode (character input mode) of inputting a search word to a predetermined input region (input region 254 described later, here). Also, since characters are required to be input, the mobile phone apparatus 10 is opened to make the second keypad 26b usable.

Generally, in such a mobile phone apparatus 10, when the mobile phone apparatus 10 is opened, that is, when the first case 50 starts to be slid, or when the mobile phone apparatus 10 is in the open position, the backlight 44 is illuminated to light up each key of the second keypad 26b.

However, even if the mobile phone apparatus 10 is shifted to the open position, characters are not necessarily input, and thus, each key of the second keypad 26b need not be illuminated before characters are actually input. That is, in the aforementioned case, when the backlight 44 illuminates, electric power may be wasted. Thus, the last of the secondary battery 48 becomes short.

Thereupon, in this embodiment, by making the backlight 44 suitably illuminate, the power consumption due to the illumination of the backlight 44 is reduced to thereby make the last of the secondary battery 48 as long as possible.

Briefly speaking, when the mobile phone apparatus 10 is in the open position, and a character input to the predetermined input region is instructed, the backlight 44 is illuminated. In addition, when the character input mode is ended, or when the mobile phone apparatus 10 is closed, the backlight 44 is shut off. Also, in the character input mode, when there is no key operation (key included in the second keypad 26b in this embodiment. This holds true hereunder.) for more than a predetermined time (10 seconds in this embodiment) as well, the backlight 44 is shut off. In such a case, it is determined that the user is considering contents to be input, and the backlight 44 is shut off to thereby lower the waste of the power consumption. Here, the aforementioned predetermined time is changeable by the user. This holds true for a case of a character input hereunder. Furthermore, in a case that the character input mode is not ended, or in a case that the mobile phone apparatus 10 is not closed, when the key is input again, the backlight 44 illuminates. Here, a time when the mobile phone apparatus 10 is closed means a time when the first case 50 starts to slide so as to cover the second keypad 26b provided on the second case 52 from the open position of the mobile phone apparatus 10. In this embodiment, when the mobile phone apparatus 10 starts to be closed, the backlight 44 is shut off, but when it is in the closed position, the backlight 44 may be shut off.

For example, when the mobile phone apparatus 10 is shifted to the open position, the web screen 200 is displayed laterally as shown in FIG. 5(A). This is because in a case that characters are input, the mobile phone apparatus 10 is turned 90 degrees to the left (counterclockwise) from the position shown in FIG. 2 (B) and FIG. 3(C), and is held laterally. However, by merely shifting the mobile phone apparatus 10 to the open position, a character input has not yet been instructed, and thus, the backlight 44 does not illuminate.

On the web screen 200 shown in FIG. 5(A), in a case that characters, such as "news", "weather", "horoscope", etc. are touched, another webpage to which a hyperlink is set is displayed. In this case as well, a character input is not instructed, and thus, the backlight 44 does not illuminate. On the other hand, on the web screen 200 shown in FIG. 5(A), when the display region 202 is touched, a character input to the predetermined input region 254 is instructed, and the backlight 44 illuminates. That is, a transition to the character input mode is made. Furthermore, a search word input screen 250 as shown in FIG. 5(B) is displayed on the display 30 at this time.

On the search word input screen 250 shown in FIG. 5(B), a display region 252, an input region 254 and a display region 256 are provided. In the display region 252, a message indicating that the input region 254 is for inputting a word for search (search word) is displayed. In the input region 254, according to a key operation by the user, characters or the like are input (displayed). At this time, the backlight 44 illuminates to thereby allow the user to easily know the characters, etc. that are able to be input with each key. In a case that the character input mode is set, the backlight 44 similarly illuminates hereunder. It should be noted that in a case that the search word input screen 250 is displayed, when a key input absent state continues for a predetermined time, the backlight 44 is shut out.

Furthermore, in the display region 256, a button image 260 and a button image 262 are displayed. The button image 260 is provided for ending the input of a search word, and returning to the web screen 200 shown in FIG. 5(A). Although illustration is omitted, when the button image 260 is touched after the input of the search word, the web screen 200 on which characters or the like that were input to the input region 254 is displayed in the display region 202 is displayed on the display 30. At this time, the character input mode is terminated, and thus, the backlight 44 is shut out. Succeedingly, when the button image 204 is touched, a web page relating to the characters or the like displayed in (input to) the input region 202 is searched.

The button image 262 is provided for cancelling the input of a search word. When the button image 262 is touched, the input of a search word is suspended to return to the web screen 200 shown in FIG. 5(A). At this time, the characters or the like input to the input region 254 are erased. Accordingly, the display region 202 of the web screen 200 remains blank. Furthermore, in a case of returning to the web screen 200, the character input mode is terminated, and thus, the backlight 44 is shut off.

As described above, when the mobile phone apparatus 10 is shifted to the open position, and then the input region 202 is touched, the backlight 44 is illuminated, but the order may be reversed. That is, when the input region 202 is touched to make a transition to the character input mode, and then, the mobile phone apparatus 10 is shifted to the open position, the backlight 44 may be illuminated.

Although a detailed description is omitted, as described above, even in the character input mode for inputting a search word, when the mobile phone apparatus 10 is closed, more strictly when the first case 50 starts to be slid so as to cover the second keypad 26b as well, the backlight 44 is shut off.

These hold true for execution of the mail function and the address book function as described later. Although the detailed description is omitted, this holds true for other functions required to input characters.

In addition, when the icon 104 is touched on the main menu screen 100 as shown in FIG. 4(A) to execute the mail function, and new mail creation is selected on a menu screen (not shown) about the mail function, a new mail creation screen 300 as shown in FIG. 6(A) is displayed on the display 30.

Although illustration is omitted, the character input region is not touched, that is, a transition to the character input mode is not made from when the mail function is executed to when the new mail creation screen 300 is displayed, and thus, even if the mobile phone apparatus 10 is in the open position, the backlight 44 never illuminates.

On the new mail creation screen 300 shown in FIG. 6(A), a display region 302, a display region 304, a display region 306, a display region 308 and a display region 310 are provided. The display region 302 is a region for displaying a destination (name or mail address) of electronic mail. The display region 304 is a region for displaying a subject. The display region 306 is a region for displaying a filename of an attached file. The display region 308 is a region for displaying a text. In the display region 310, a button image 320 and a button image 322 are displayed. The button image 320 is provided for sending created e-mail. Also, the button image 322 is provided for suspending (cancelling) creation of e-mail.

For example, when the display region 308 is touched on the new mail creation screen 300 shown in FIG. 6(A), a character input to a predetermined input region (input region 354 described later, here) is instructed, and the backlight 44 illuminates. That is, a transition to the character input mode is made. Furthermore, at this time, a mail text creation screen 350 as shown in FIG. 6(B) is displayed on the display 30.

On the mail text creation screen 350, a display region 352, the input region 354 and a display region 356 are provided. In the display region 352, a message indicating that the input region 354 is a region for inputting a text is displayed. The input region 354 is a region for inputting a text (message). Accordingly, by operating the keys included in the second keypad 26b, desired character strings, that is, a text (message) can be input to the input region 354. It should be noted that in a case that the mail text creation screen 350 is displayed when a key input absent state has continued for a predetermined time, the backlight 44 is shut off.

Additionally, in the display region 356, a button image 360 and a button image 362 are displayed. The button image 360 is provided for terminating the input of a text, and returning to the new mail creation screen 300 shown in FIG. 6(A). Although illustration is omitted, after the text is input, when the button image 360 is touched, the new mail creation screen 300 in which characters, or the like that were input in the input region 354 is displayed in the display region 308 is displayed on the display 30. At this time, the character input mode is terminated, and thus, the backlight 44 is shut off.

The button image 362 is provided for cancelling an input of a text. When the button image 362 is touched, the input of the text is suspended to return to the new mail creation screen 300 shown in FIG. 6(A). At this time, the characters or the like input to the input region 354 are erased. Accordingly, the display region 308 of the new mail creation screen 300 remains blank. Also, after return to the new mail creation screen 300, the character input mode is terminated to make the backlight 44 shut off.

Although illustration and detailed description are omitted, in a case that the display region 302 and the display region 304 are touched on the new mail creation screen 300 as well, an input to a predetermined input region is instructed, and screens for inputting a destination and a subject are displayed similar to the case that the display region 308 is touched. Here, if a destination is selected from the address book, character strings of the destination need not be input. Thus, after the display region 302 is touched, in a case that an input from the address book is selected, an input to the predetermined input region is not instructed, and thus, the backlight 44 is not illuminated. That is, only when a direct input of a destination is selected, an input to the predetermined input region is instructed, and the backlight 44 is illuminated. Also, after inputting the destination and the subject is ended, when the OK button (button image 360) as shown in FIG. 6(B) is touched, on the new mail creation screen 300, the destination is displayed in the display region 302, and the subject is displayed in the display region 304.

Furthermore, in a case that the display region 306 is touched, an attached file is merely selected from a predetermined folder, and thus, the backlight 44 does not illuminate. Also, when the attached file is selected to return to the new mail creation screen 300, a filename of the attached file is displayed in the display region 306.

When the icon 106 is touched on the main menu screen 100 shown in FIG. 4(A) to execute the address book function, and a new registration is selected (designated), an address book new registration screen 400 as shown in FIG. 7(A) is displayed on the display 30.

On the address book new registration screen 400, a display region 402, a display region 404, a display region 406, a display region 408 and a display region 410 are provided. The display region 402 is a region for displaying a name (designation). The display region 404 is a region for display a phone number. The display region 406 is a region for displaying an e-mail address. The display region 408 is a region for displaying an address.

Here, although illustration is omitted for sake of simplicity, regions for displaying other information such as birthday, blood type, image file, etc. are also provided.

For example, when the display region 402 is touched on the address book new registration screen 400 shown in FIG. 7(A), an input of characters or the like to a predetermined input region (input region 454 described later, here) is instructed, and the backlight 44 illuminates. That is, a transition to the character input mode is made. Furthermore, at this time, a name input screen 450 as shown in FIG. 7(B) is displayed on the display 30.

On the name input screen 450, a display region 452, the input region 454 and a display region 456 are provided. In the display region 452, a message indicating that the input region 454 is a region for inputting a name is displayed. The input region 454 is a region for inputting a name (designation). In the display region 456, a button image 460 and a button image 462 are displayed.

The button image 460 is provided for ending the input of a name, and returning to the address book new registration screen 400 shown in FIG. 7(A). Although illustration is omitted, after a name is input, when the button image 460 is touched, the address book new registration screen 400 in which with the name that was input in the input region 454 is displayed in the display region 402 is displayed on the display 30. Although it cannot be expressed in the drawing, the character input mode is terminated at this time, and thus, the backlight 44 is shut off.

The button image 462 is for cancelling the input of a name. When the button image 462 is touched, the input of a name is suspended to return to the address book new registration screen 400 shown in FIG. 7(A). At this time, the name input in the input region 454 is erased. Accordingly, the display region 402 of the address book new registration screen 400 remains blank. Furthermore, after return to the address book new registration screen 400, the character input mode is terminated, and thus, the backlight 44 is shut off.

Although the illustration and detailed description are omitted, in a case that on the address book new registration screen 400, the display regions 404, 406, 408 are touched as well, similar to a case that the display region 402 is touched, an input to the predetermined input region is instructed, and a screen for inputting a phone number, an e-mail address or an address is displayed. Furthermore, when inputting the phone number, the e-mail address or the address are ended, and the OK button (button image 460) as shown in FIG. 7(B) is touched, on the address book new registration screen 400, the phone number is displayed in the display region 404, the e-mail address is displayed in the display region 406, and an address is displayed in the display region 408.

Figure 8:
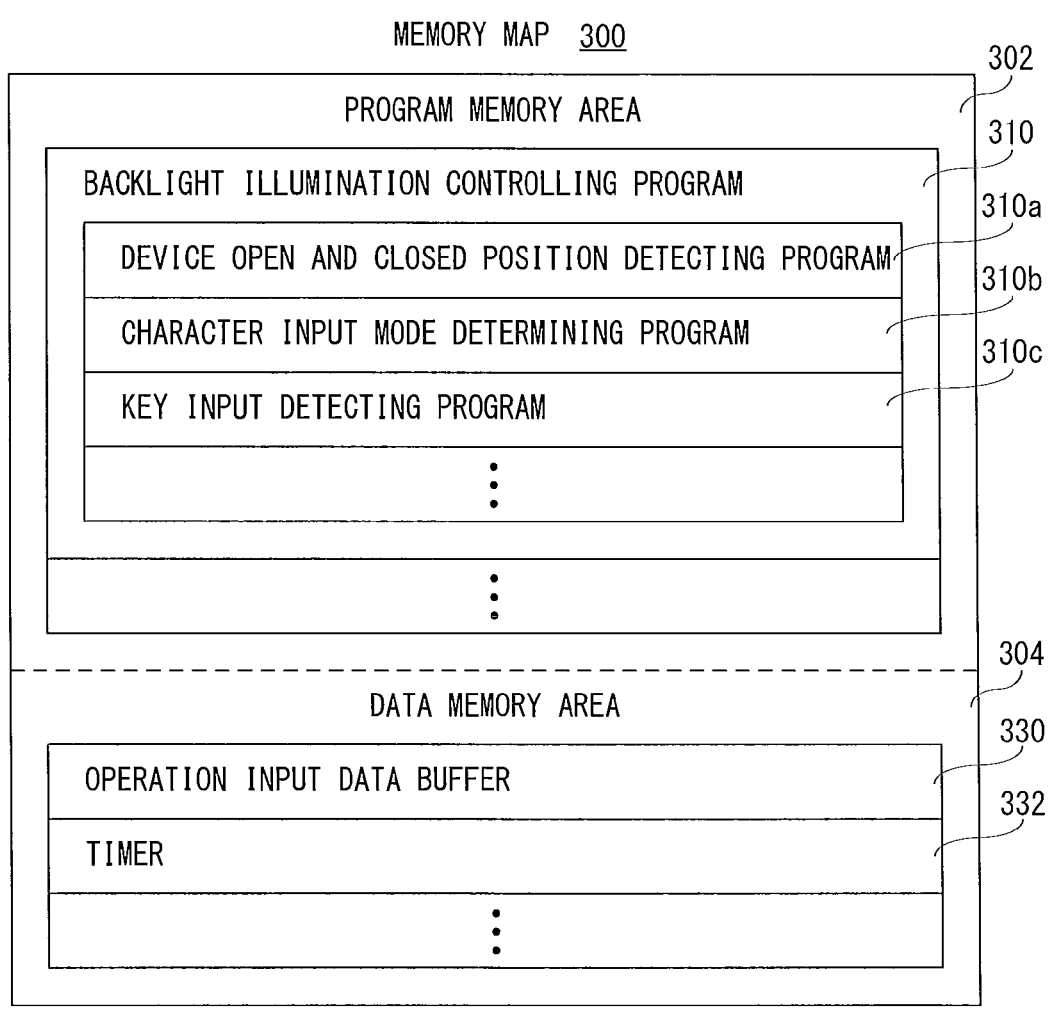
FIG. 8 is an illustrative view showing a memory map of a RAM shown in FIG. 1.

FIG. 8 shows an illustrative view showing a memory map 300 of the RAM 34 shown in FIG. 1. The RAM 34 includes a program memory area 302 and a data memory area 304. In the program memory area 302, an information processing program for entirely controlling the mobile phone apparatus 10 is stored, and the information processing program is made up of a backlight illumination controlling program 310, etc. Although lustration is omitted, as a function of the mobile phone apparatus 10, a program for notifying an incoming state, a speech communication program and a communication program, etc. are also stored.

The backlight illumination controlling program 310 is a program for controlling illumination and shutoff of the backlight 44. The backlight illumination controlling program 310 includes a device open and closed position detecting program 310a, a character input mode determining program 310b, a key input detecting program 310c, etc.

The device open and closed position detecting program 310a is a program for detecting whether or not the mobile phone apparatus 10 is in the open position or the closed position. More specifically, the processor 24 determines that the mobile phone apparatus 10 is in the open position in a case that magnetism data from the magnetic sensor 40 matches the maximum value data. Also, the processor 24 determines that the mobile phone apparatus 10 is in the closed position in a case that the magnetism data from the magnetic sensor 40 matches the minimum value data. Here, the processor 24 determines whether or not it is at some midpoints from the closed position to the open position or from the open position to the closed position when the magnetism data indicates a numerical value between the maximum value data and the minimum value data.

The character input mode determining program 310b is a program for determining whether a character input mode or not. In this embodiment, the processor 24 shifts to the character input mode when a character input to a predetermined input region (254, 354, 454 in this embodiment) is instructed, that is, when the predetermined display region (202, 302, 304, 308, 402, 404, 406, 408 in this embodiment) is touched, and terminates the character input mode when an input to a predetermined input region is ended (OK) or suspended (canceled). Here, the character input mode is continued from the transition to the character input mode to the end of the character input mode.

The key input detecting program 310c is a program for detecting whether or not there is an input (key input) from the key included in the second keypad 26b. In this embodiment, the processor 24 determines that there is a key input in a case that the key data of the key included in the second keypad 26b is input, and determines that there is no key input in a case that the key data of the key included in the second keypad 26b is not input.

Furthermore, in the data memory area 304, an operation input data buffer 330 and a timer 332 are provided. The operation input data buffer 330 stores (temporarily stores) key data from the key input device 26 (first keypad 26a and second keypad 26b) and coordinate data from the touch panel control circuit 36. The key data and the coordinate data that are stored in the operation input data buffer 330 are deleted after used in the processing by the processor 24. The timer 332 is a timer for counting a time during which a key input absent state has continued, and is reset and started by the processor 24.

Although illustration is omitted, in the data memory area 304, data necessary for execution of the information processing program including the backlight illumination controlling program is stored, and other timers (counters) and flags are also provided.

Figure 9:
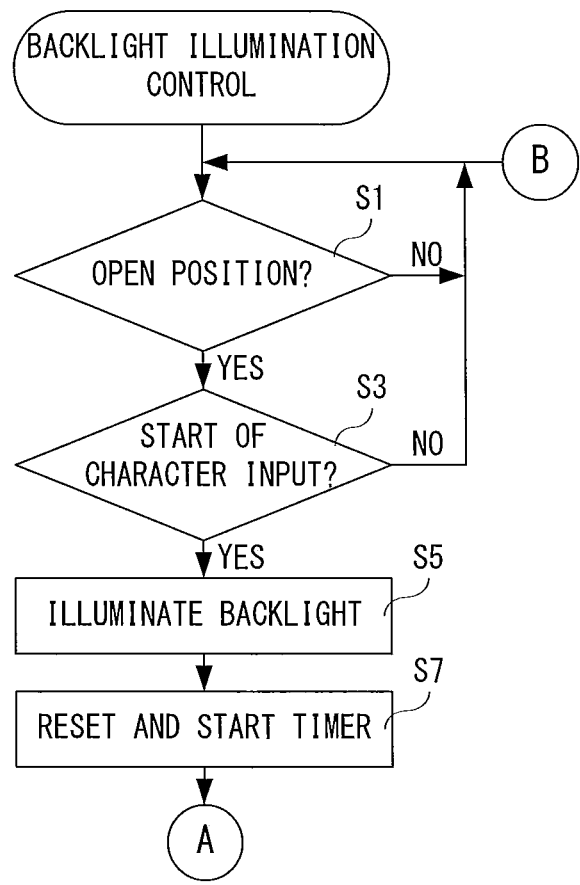
FIG. 9 is a flowchart showing a part of backlight illumination controlling processing by a processor shown in FIG. 1.
Figure 10:
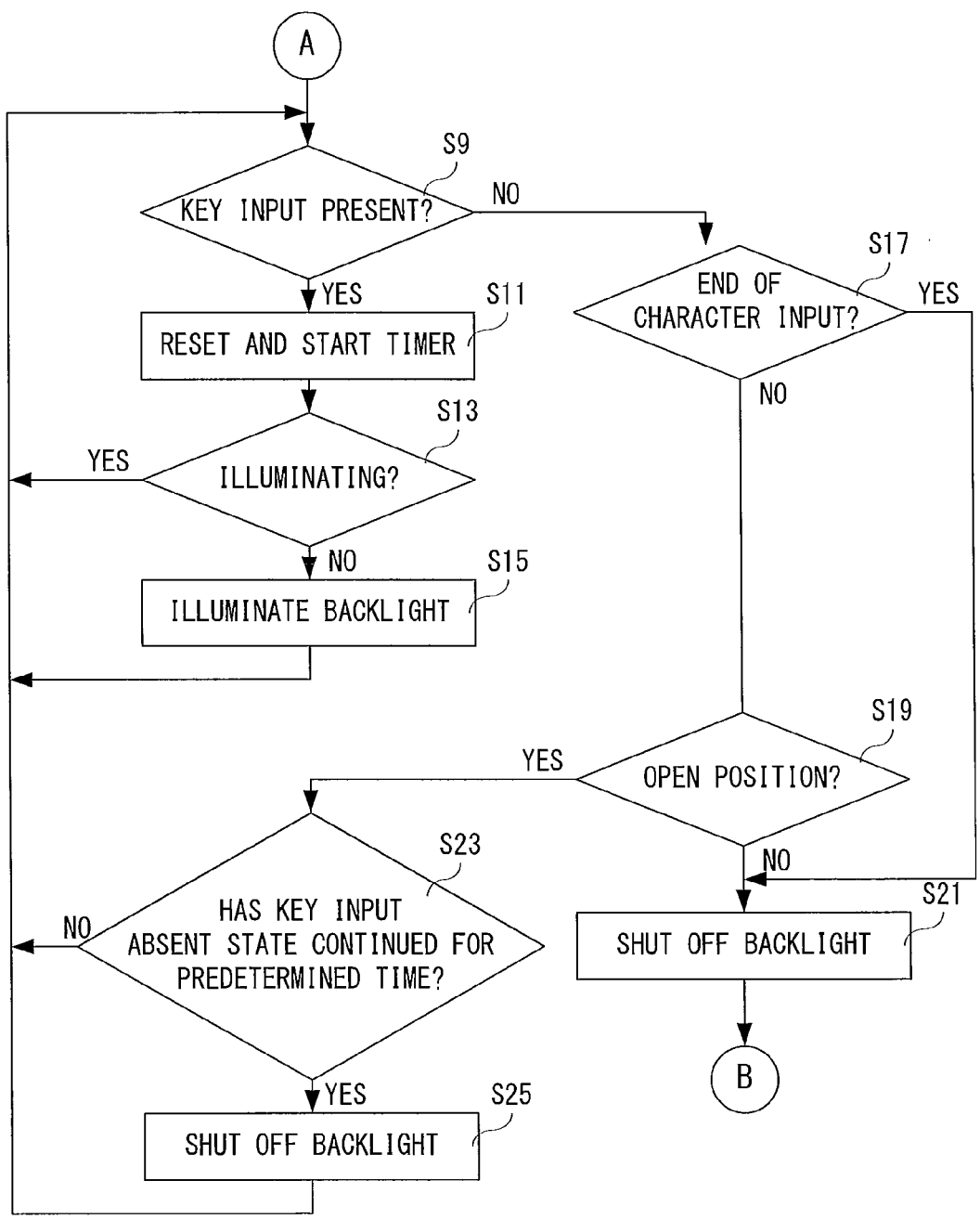
FIG. 10 is a flowchart showing another part of the backlight illumination controlling processing by the processor shown in FIG. 1, being sequel to FIG. 9.

FIG. 9 and FIG. 10 are flowcharts showing backlight illumination controlling processing by the processor 24 shown in FIG. 1. Although illustration is omitted, processing of the above-described browser function, mail function and address book function are executed in a task different from a task executing the backlight illumination controlling processing.

As shown in FIG. 9, the processor 24 determines whether or not the mobile phone apparatus 10 is in the open position in a step S1 when starting the backlight illumination controlling processing. That is, the processor 24 determines whether or not the magnetism data from the magnetic sensor 40 matches the maximum value data. If "NO" in the step S1, that is, if the mobile phone apparatus 10 is not in the open position, the process returns to the same step S1 as it is. On the other hand, if "YES" in the step S1, that is, if the mobile phone apparatus 10 is in the open position, it is determined whether or not there is an instruction of starting a character input in a step S3. That is, the processor 24 determines whether or not a character input to the predetermined input region (254, 354, 454, for example) is instructed.

If "NO" in the step S3, that is, if there is no instruction of starting a character input, the process returns to the step S1 as it is. On the other hand, if "YES" in the step S3, that is, if there is an instruction of starting a character input, the backlight 44 is illuminated in a step S5. Although the illustration is omitted, when "YES" in the step S3, a transition to the character input mode is made. Then, in a step S7, the timer 332 is reset and started, and then, the process proceeds to a step S9 shown in FIG. 10.

In the step S9 shown in FIG. 10, it is determined whether or not there is a key input. That is, the processor 24 determines whether or not the key data of the current frame stored in the operation input data buffer 330 is the key data of the key included in the second keypad 26b.

It should be noted that the frame means a unit time (1/60 sec., for example) in the mobile phone apparatus 10. Furthermore, a scan time of the backlight illumination controlling processing shown in FIG. 9 and FIG. 10 is one frame.

If "YES" in the step S9, that is, if there is a key input, the timer 332 is reset and started in a step S11, and it is determined whether or not the backlight 44 is illuminating in a step S13. If "YES" in the step S13, that is, if the backlight 44 is illuminating, the process returns to the step S9 as it is. On the other hand, if "NO" in the step S13, that is, if the backlight 44 is shut off, the backlight 44 is illuminated in a step S15, and the process returns to the step S9. That is, in a case that the mobile phone apparatus 10 is in the open position, it is in the character input mode, and the backlight 44 is shut off in response to an absence of a key input for a predetermined time (10 sec., for example) or more as well, when the key input is restarted, the backlight 44 is illuminated.

Furthermore, if "NO" in the step S9, that is, if there is no key input, it is determined whether or not the character input is ended in a step S17. That is, the processor 24 determines whether or not the character input mode is ended. If "YES" in the step S17, that is, if the character input is ended, the process proceeds to a step S21 as it is. On the other hand, if "NO" in the step S17, that is, if the character input is not ended, it is determined whether or not the mobile phone apparatus 10 is in the open position in a step S19.

If "NO" in the step S19, that is, if the mobile phone apparatus 10 is not in the open position, the backlight 44 is shut off in the step S21, and the process returns to the step S1 shown in FIG. 9. On the other hand, if "YES" in the step S19, that is, if the mobile phone apparatus 10 is in the open position, it is determined whether or not a key input absent state has continued for a predetermined time in a step S23. That is, the processor 24 determines whether or not the count value of the timer 332 is larger than the predetermined time. Here, as described above, the key input is a key input of the key included in the second keypad 26b.

If "NO" in the step S23, that is, if the key input absent state has not continued for the predetermined time, the process returns to the step S9 as it is. On the other hand, if "YES" in the step S23, that is, if the key input absent state has continued for the predetermined time, the backlight 44 is shut off in the step S19, and the process returns to the step S9.

According to this embodiment, when the mobile phone apparatus is shifted to the open position, and a character input is instructed, the backlight of the hardware key is illuminated, and therefore, it is possible to reduce power consumption. Thus, it is possible to make the last of the battery as long as possible.

Furthermore, in the above-described embodiment, when the display region is touched, a screen for inputting contents to be displayed in the display region is displayed on the display, but there is no need of being restricted thereto. In a case that the number of symbols like characters to be input, such as a search word of the web screen, an e-mail address and a subject of electronic mail, a name, a phone number and an e-mail address of the address book, is relatively few, they may be directly input in the display region without displaying the input screen. That is, in such a case, the display region can be used as a character input region. Here, in a case that a scrolling function is equipped, even if the number of symbols like characters to be input is relatively many, such as a text of e-mail and an address of the address book, they can be directly input in the display region without displaying the input screen.

Additionally, in this embodiment, the mobile phone apparatus has a touch panel, and therefore, by touching a predetermined display region according to a touch operation, a character input to the predetermined input region is designated, but there is no need of being restricted thereto. By selecting a predetermined display region by means of the direction key and the decision key included in the first keypad, a character input to the predetermined input region may be designated. Furthermore, in a case that the button image is turned on as well, the direction key and the decision key may be used.

Furthermore, in the above-described embodiment, alphabetical character keys that are arranged according to a QWERTY layout are provided to the second case, but in place thereof, a dial key including a "0"-"9" keys, a "*" key and a "#" key may be provided. In such a case, the sliding direction of the first case may be the longitudinal direction of the second case.

Moreover, in the aforementioned embodiment, by means of the magnetic sensor and the magnet, opening or closing of the mobile phone apparatus (first case and second case) is detected, but in place of the magnetic sensor and the magnet, a mechanical switch that is switched between ON and OFF in response to the opening and closing of the mobile phone apparatus may be provided.

Also, in the above-described embodiment, the first keypad is made up of the hardware keys, but may be made up of software keys. In such a case, for example, a touch panel is provided so as to cover the range where the first keypad of the first case is provided, and the respective keys of the first keypad are displayed as images.

In addition, in this embodiment, the description is made on slidable mobile phone apparatuses, but the present embodiment can be applied to foldable mobile phone apparatuses. For example, in the foldable mobile phone apparatuses, a first case provided with a display and a second case provided with hardware keys are coupled by a hinge, and in the open position, the hardware keys are exposed, and the display and the hardware keys are vertically aligned while in the closed position, the display and the hardware keys face to face with each other, and the hardware keys are covered with the first case.

In addition, in this embodiment, the description is made on only mobile phone apparatuses, but there is no need of being restricted thereto, and the present embodiment can be other mobile terminals, such as PDAs, electronic dictionaries, or small-sized PCs, etc.

Moreover, in the above-described embodiment, a CDMA system is adopted as a communication system, but other systems, such as an LTE (Long Term Evolution) system, a W-CDMA system, a GSM system, a TDMA system, a FDMA system and a PHS system, etc. may be adopted without being restricted thereto.

It should be noted that all the concrete numerical values of the predetermined time, etc. and each screen that are depicted in the specification are simple examples, and are changeable as necessary depending on the specification of the product.

Although the present invention has been described and illustrated in detail, it is clearly understood that the same is by way of illustration and example only and is not to be taken by way of limitation, the spirit and scope of the present invention being limited only by the terms of the appended claims.

Preferably, the mobile terminal further comprises a first case provided with the displayer, and a second case provided with the hardware key, and the first case and the second case are provided to be openable and closable between a closed position in which the first case covers the hardware key provided to the second case and an open position in which the first case uncovers the hardware key of the second case.

The mobile terminal further comprises the first case (50) and the second case (52). The first case is provided with the displayer, and the second case is provided with the hardware key. The first case and the second case are provided to be openable and closable, and in the closed position, the first case covers the hardware key provided to the second case while in the open position, it uncovers the hardware key provided to the second case.

According to the mobile terminal, the first case and the second case are provided to be openable and closeable, and therefore, it is possible to downsize the mobile terminal.

Preferably, the illuminator suspends the illumination when the first case is shifted to the closed position in which it covers the hardware key provided to the second case, and starts to illuminate when the first case is shifted to the open position in which the first case uncovers the hardware key provided to the second case, and a character input to the predetermined character input region displayed on the displayer is instructed.

In the mobile terminal, the illuminator suspends the illumination when the first case is in the closed position in which the first case covers the hardware key provided to the second case ("NO" in S19). Here, the illuminator may suspend the illumination when the open position is released. Furthermore, the illuminator starts to illuminate when the first case is shifted to the open position in which the first case uncovers the hardware key provided to the second case, and a character input to a predetermined character input region displayed on the displayer is instructed. Accordingly, even if a character input to the predetermined character input region is instructed, the illuminator does not illuminate when the mobile terminal is in the closed position.

According to the mobile terminal, not only when a character input to the predetermined character input region is instructed, but also when the hardware key is usable in the open position, the illuminator illuminates, and therefore, it is possible to make the illuminator illuminate only when necessary. Accordingly, it is possible to reduce a waste of electric power consumption.

Preferably, the predetermined character input region is an input region of a search word.

In the mobile terminal, the predetermined character input region (254, 354, 454) is the input region (254) of a search word. That is, the predetermined character input region is a region in which a character input is performed by means of the hardware keys.

According to the mobile terminal, only when the hardware keys are used, the illuminator can be illuminated.

Preferably, the mobile terminal further comprises a touch panel provided on the displayer, and the illuminator starts to illuminate when the first case is shifted to the open position in which it uncover the hardware key provided to the second case, and a character input to a predetermined character input region is instructed by an input from the touch panel.

The mobile terminal further comprises a touch panel (38) provided on the displayer. Accordingly, the illuminator starts to illuminate when the first case is shifted to the open position in which it uncover the hardware key provided to the second case, and a character input to a predetermined character input region is instructed by an input from the touch panel. That is, in accordance with a user's touch, a character input to the predetermined character input region can be instructed.

According to the mobile terminal, a character input to the predetermined character input region is instructed by a touch, thus making operations easy.

Preferably, the mobile terminal further comprises a plurality of hardware keys, and the plurality of hardware keys are keys according to a QWERTY layout.

In the mobile terminal, the hardware keys are keys according to a QWERTY layout, that is, a QWERTY keyboard.

According to the mobile terminal, the QWERTY keyboard is provided, and therefore, it is possible to input characters according to operations similar to those on computers, capable of improving usability.

What is claimed is:

1. A mobile terminal which takes an open state or a closed state, the mobile terminal comprising:
    a first case provided with a display;
    a touch panel provided on said display and configured to detect a touch;
    a second case provided with a keypad comprising a plurality of hardware input keys, said keypad being exposed in said open state but not exposed in said closed state, wherein said first case and said second case are configured to be shifted between said closed state in which said first case covers said keypad and said open state in which said keypad is exposed; and
    an illuminator that illuminates each of said plurality of hardware input keys on said keypad in response to a touch detected by the touch panel, at a position that corresponds to a character input region displayed on said display, in said open state,
    wherein said illuminator suspends the illumination in response to said first case and said second case being shifted to said closed state, and
    wherein the illuminator does not illuminate each of said plurality of hardware input keys on said keypad, even when said first case and said second case are shifted to the open position, until the touch is detected at the position that corresponds to the character input region displayed on said display.

2. The mobile terminal according to claim 1, wherein said character input region is configured to receive an input of a search word.

3. The mobile terminal according to claim 1, wherein said plurality of hardware input keys are arranged in a QWERTY layout.

4. A controlling method of a mobile terminal which takes an open state or a closed state and comprises a display, a touch panel provided on said display and configured to detect a touch, and a keypad comprising a plurality of hardware input keys, said keypad being exposed in said open state but not exposed in said closed state, wherein the method comprises:
    when the mobile terminal is switched to said closed state, suspending illumination of each of said plurality of hardware input keys;
    when the mobile terminal is switched to said open state, not illuminating said plurality of hardware input keys until a touch is detected by the touch panel, at a position that corresponds to a character input region displayed on said display, in said open state; and,
    in response to the detection of said touch in said open state, illuminating each of said plurality of hardware input keys on said keypad.

5. The mobile terminal according to claim 1, wherein said illuminator illuminates all of the plurality of hardware input keys in response to the touch detected by the touch navel.

6. The mobile terminal according to claim 1, wherein illuminating each of said plurality of hardware input keys on said keypad comprises turning on a backlight of each of said plurality of hardware input keys.

7. A method for controlling a mobile terminal comprising a display, a touch panel provided on the display and configured to detect a touch, and a keypad comprising a plurality of hardware input keys configured to be illuminated by a backlight, wherein the mobile terminal is configured to be shifted between a closed position in which the plurality of hardware input keys are covered and an open position in which the plurality of hardware input keys are exposed, and wherein the method comprises:
    if the mobile terminal is in the closed position, not illuminating the backlight to not illuminate each of said plurality of hardware input keys; and,
    if the mobile terminal is in the open position,
        until a touch is detected by the touch panel at a position that corresponds to a character input region displayed on said display, not illuminating the backlight of the one or more hardware input keys, and
        in response to a detection of a touch by the touch panel at a position that corresponds to a character input region displayed on said display in the open position, illuminating the backlight to illuminate each of said plurality of hardware input keys on said keypad for at least a predetermined time.

8. The method of claim 7, further comprising, in response to an operation that terminates an input of text into a character input region, suspending illumination of the backlight of each of the plurality of hardware input keys on said keypad.

* * * * *